(12) United States Patent
Thomas et al.

(10) Patent No.: US 11,871,101 B2
(45) Date of Patent: Jan. 9, 2024

(54) ALS CAMERA SYSTEM

(71) Applicants: Kevin Thomas, Charlotte, NC (US); Andrew Thompson, Charlotte, NC (US)

(72) Inventors: Kevin Thomas, Charlotte, NC (US); Andrew Thompson, Charlotte, NC (US)

(*) Notice: Subject to any disclaimer, the term of this patent is extended or adjusted under 35 U.S.C. 154(b) by 0 days.

(21) Appl. No.: 17/691,534

(22) Filed: Mar. 10, 2022

(65) Prior Publication Data

US 2022/0294947 A1  Sep. 15, 2022

Related U.S. Application Data

(60) Provisional application No. 63/159,139, filed on Mar. 10, 2021.

(51) Int. Cl.

| | |
|---|---|
| *H04N 5/335* | (2011.01) |
| *H04N 23/56* | (2023.01) |
| *G02B 7/00* | (2021.01) |
| *G06T 7/00* | (2017.01) |
| *H04N 23/55* | (2023.01) |
| *H04N 25/11* | (2023.01) |

(52) U.S. Cl.
CPC ............. *H04N 23/56* (2023.01); *G02B 7/006* (2013.01); *G06T 7/0002* (2013.01); *H04N 23/55* (2023.01); *H04N 25/11* (2023.01)

(58) Field of Classification Search
CPC ..................................................... G02B 7/006
See application file for complete search history.

(56) References Cited

U.S. PATENT DOCUMENTS

| | | | | |
|---|---|---|---|---|
| 7,098,469 | B1* | 8/2006 | Carrington | G01N 21/645 |
| | | | | 356/418 |
| 10,148,908 | B2* | 12/2018 | Odamaki | H04N 7/102 |
| 2011/0279679 | A1* | 11/2011 | Samuel | H04N 23/73 |
| | | | | 348/E5.085 |
| 2013/0089315 | A1* | 4/2013 | Yang | G03B 17/14 |
| | | | | 396/544 |
| 2013/0176482 | A1* | 7/2013 | Hirasawa | H04N 23/88 |
| | | | | 348/370 |
| 2015/0097963 | A1* | 4/2015 | Thorsted | H04N 5/30 |
| | | | | 348/162 |
| 2016/0025949 | A1* | 1/2016 | Platt | G02B 7/005 |
| | | | | 359/889 |
| 2017/0059851 | A1* | 3/2017 | Ichimoto | G02B 27/288 |
| 2018/0321463 | A1* | 11/2018 | Staley | G02B 27/141 |
| 2022/0065782 | A1* | 3/2022 | Cheung | H04M 1/72409 |

* cited by examiner

*Primary Examiner* — Gary C Vieaux
(74) *Attorney, Agent, or Firm* — AVEK IP, LLC; Blake E. Vande Garde (57) ABSTRACT

A system for detecting foreign materials comprising an alternative light source (ALS), one or more filters operationally associated with the ALS, one or more camera lenses operationally associated with the ALS and the filters, one or more processors, a computer readable memory, and a computer readable storage medium operatively associated with a computing device operatively associated with the ALS, one or more sensors operationally associated with the computing device and the ALS, wherein the sensors detect the presence of the filter and a camera operationally associated with the lens and the computing device.

14 Claims, 11 Drawing Sheets

ALS CAMERA SYSTEM

RELATED CASES

This application claims priority from U.S. Provisional Patent Application No. 63/159,139 filed on Mar. 10, 2021. The disclosure of that application is expressly incorporated herein by reference.

FIELD OF INVENTION

This invention pertains to systems and methods for detecting and analyzing foreign materials with the assistance of Alternate Light Sources and digital photography.

BACKGROUND OF THE INVENTION

Identification of biological evidence, such as blood, semen, saliva and urine, are important for crime scene and sexual assault investigation. Alternative light sources (ALS) have been used for decades to aid in the detection of biological evidence. This method is a simple, presumptive, non-destructive test and applicable for detecting most types of biological evidence. Biological evidence can be detected by forensic light source due to their natural characteristics, such as light absorption (blood) or fluorescence effect (semen, saliva and urine).

Biological evidence, such as blood, semen, saliva and urine, are among the most important evidence in crime scene and sexual assault investigation. Valuable information can be obtained from the biological evidence found, such as DNA evidence to aid in the identification of both victims and suspects, and bloodstain patterns to determine a sequence of events during the crime. Numerous methods have been developed for the identification of this biological evidence, which can be divided into presumptive tests and confirmatory tests. Presumptive tests are simply screening tests, whereas confirmatory tests will conclusively identify the type of evidence. Unfortunately, most of the tests, particularly laboratory tests, result in the destruction of the sample being tested, such as the destruction of DNA evidence.

The term forensic light source (FLS) generally refers to an illumination system adapted to a forensic application, such as laser and high intensity filtered lamps. A non-laser FLS is generally referred to as an alternative light source (ALS). An ALS is one of the simplest tools that can be used to locate and identify biological evidence. ALS can either make the evidence fluoresce or enhance the contrast of the evidence against the background. Fluorescence happens when the ALS emitted to the biological evidence, such as semen, saliva and urine, and these fluids absorb light at a particular wavelength and then re-emit the absorbed energy as light at a different (i.e., longer) wavelength.

Numerous kits are used today which include: one or more flashlights which each emit a singular wavelength of light to emit on an object being examined; one or more filters which the user of the flashlight looks through while viewing the object being examined; and one or more filters which can be placed over a camera lens. However, no system exists which ties the use of the ALS source and a variety of light wavelengths, the use of one or more filters and light levels, and a digital camera system to detect, capture, and record the presence of foreign materials.

Thus, there is clearly a need for a system for detecting materials using ALS and one or more sensors operationally associated with a camera or camera system to detect, capture, and record the presence of foreign materials.

SUMMARY OF THE INVENTION

A system for detecting foreign materials comprising an alternative light source (ALS), one or more filters operationally associated with the ALS, one or more camera lenses operationally associated with the ALS and the filters, one or more processors, a computer readable memory, and a computer readable storage medium operatively associated with a computing device operatively associated with the ALS, one or more sensors operationally associated with the computing device and the ALS, wherein the sensors detect the presence of the filter and a camera operationally associated with the lens and the computing device.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
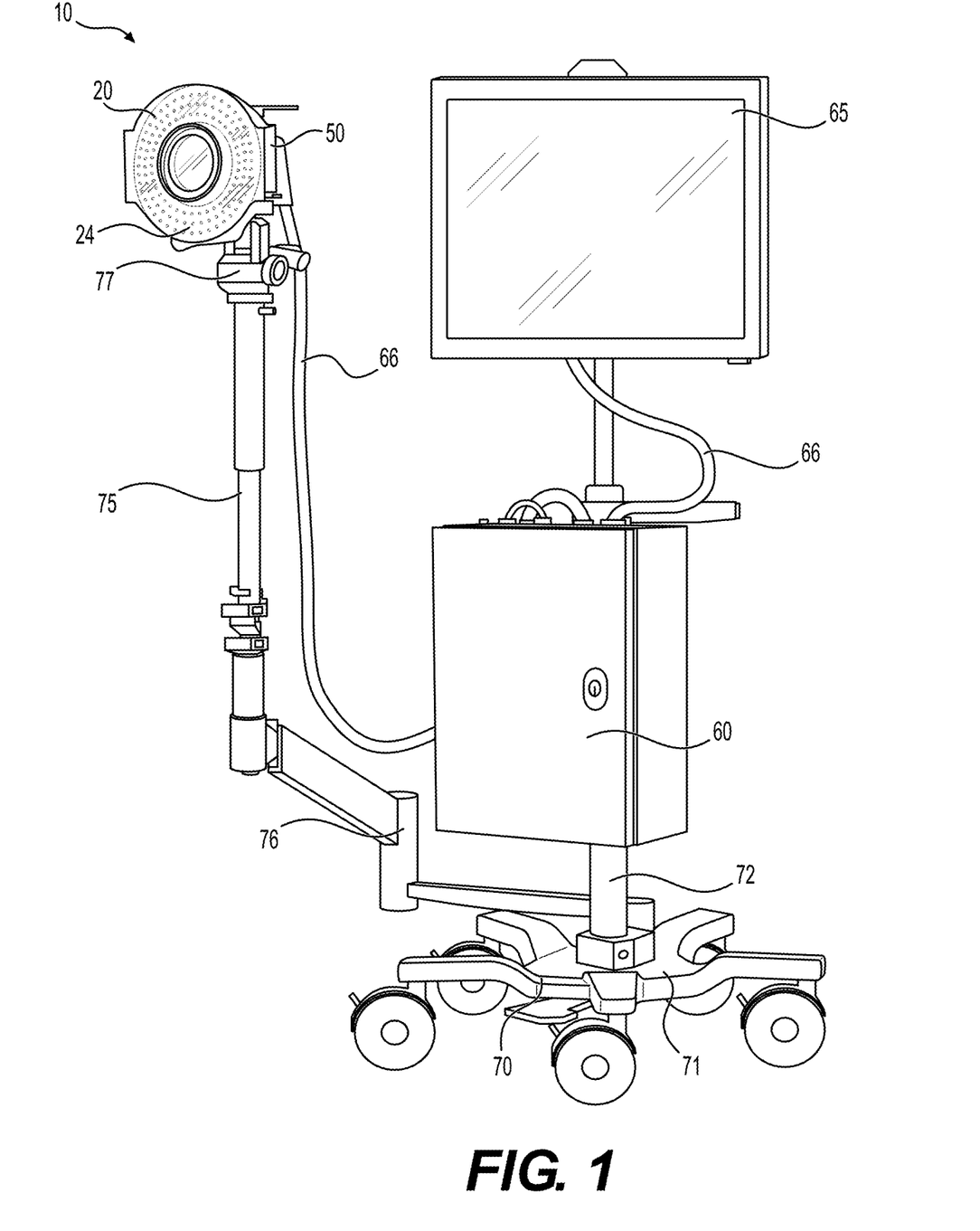
FIG. 1 is a view of the system of the instant invention.
Figure 2:
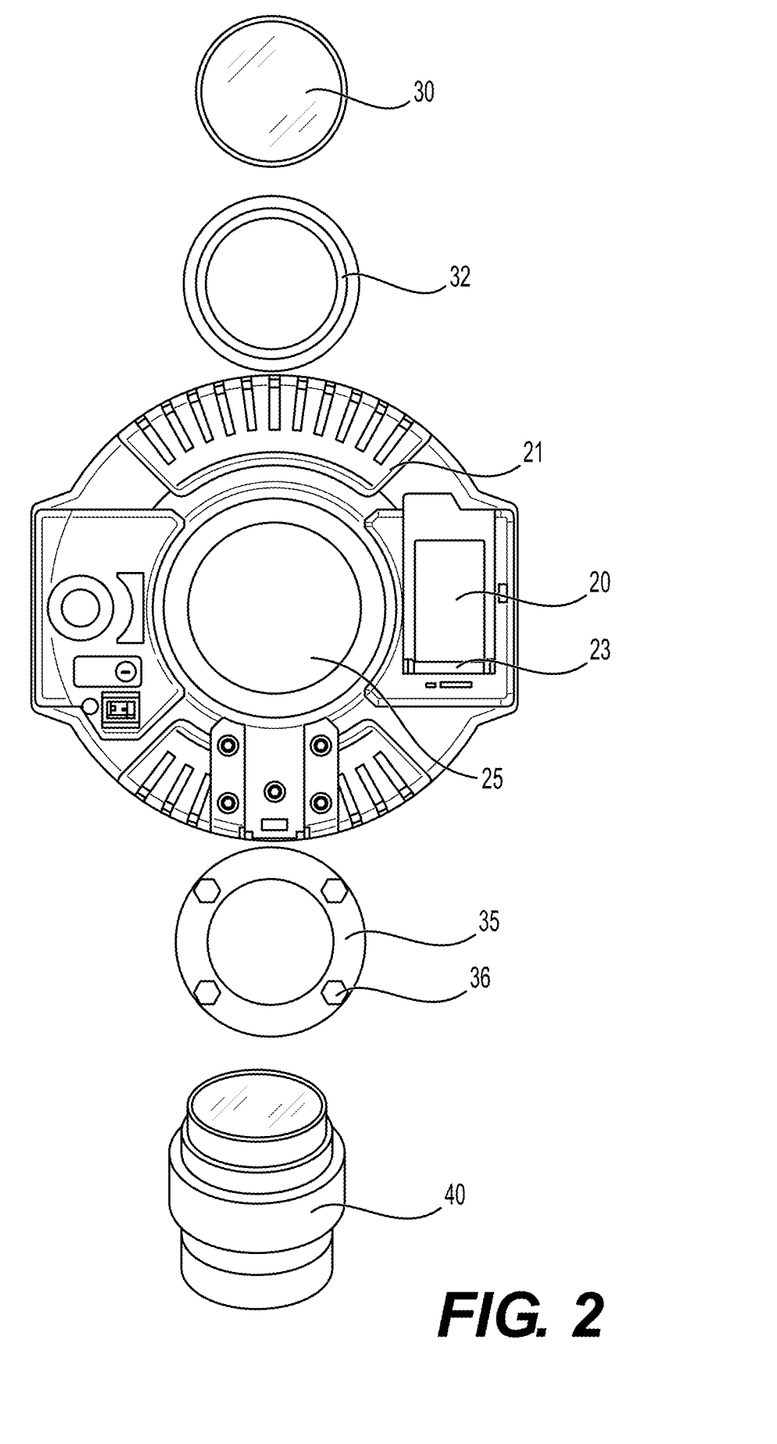
FIG. 2 is an exploded view of one embodiment of ALS hardware used in the system of the instant invention.
Figure 3:
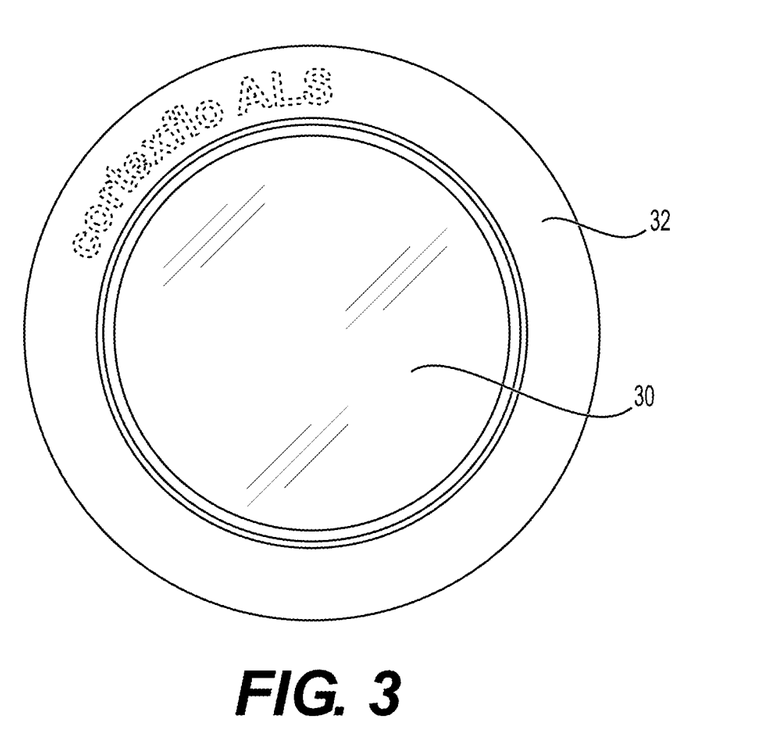
FIG. 3 is a front view of one embodiment of an ALS filter holder with an orange filter used in the instant invention.
Figure 4:
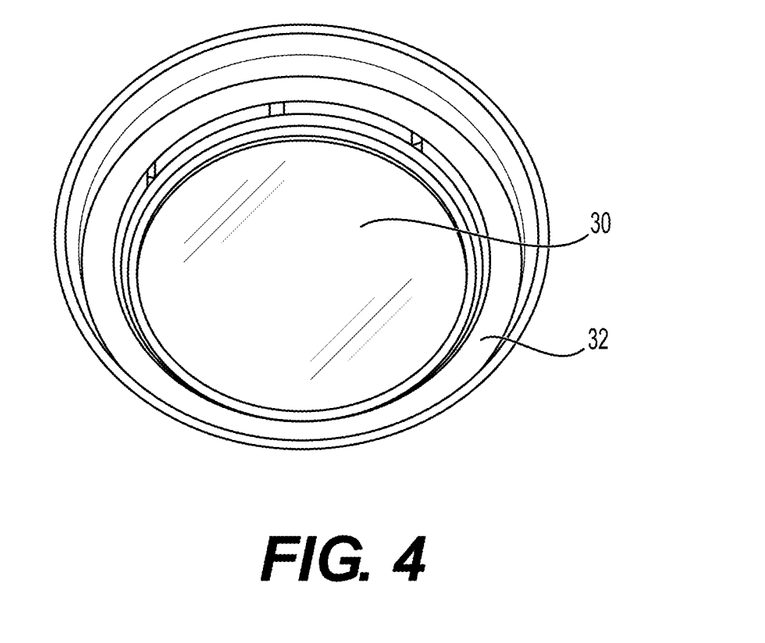
FIG. 4 is a proximal view of one embodiment of an ALS filter holder with an orange filter used in the instant invention.
Figure 5:
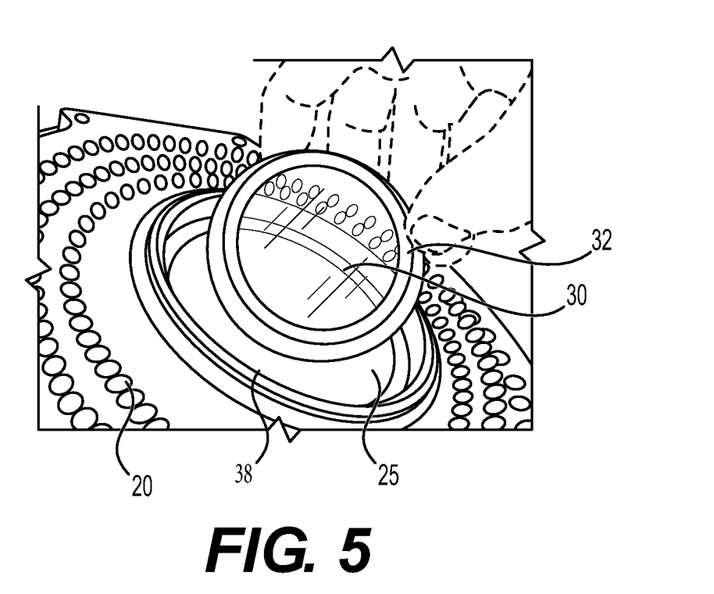
FIG. 5 is a proximal view of one embodiment of an ALS filter holder with an orange filter used in the instant invention.
Figure 6:
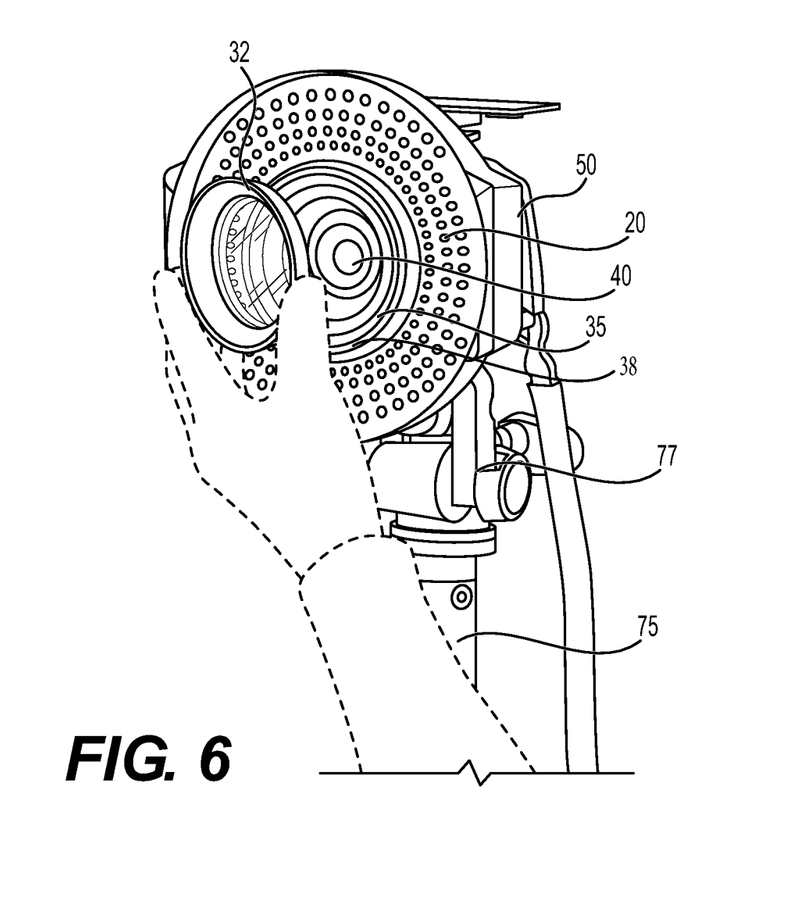
FIG. 6 is a proximal view of one embodiment of an ALS filter holder with an orange filter used in the instant invention.
Figure 7:
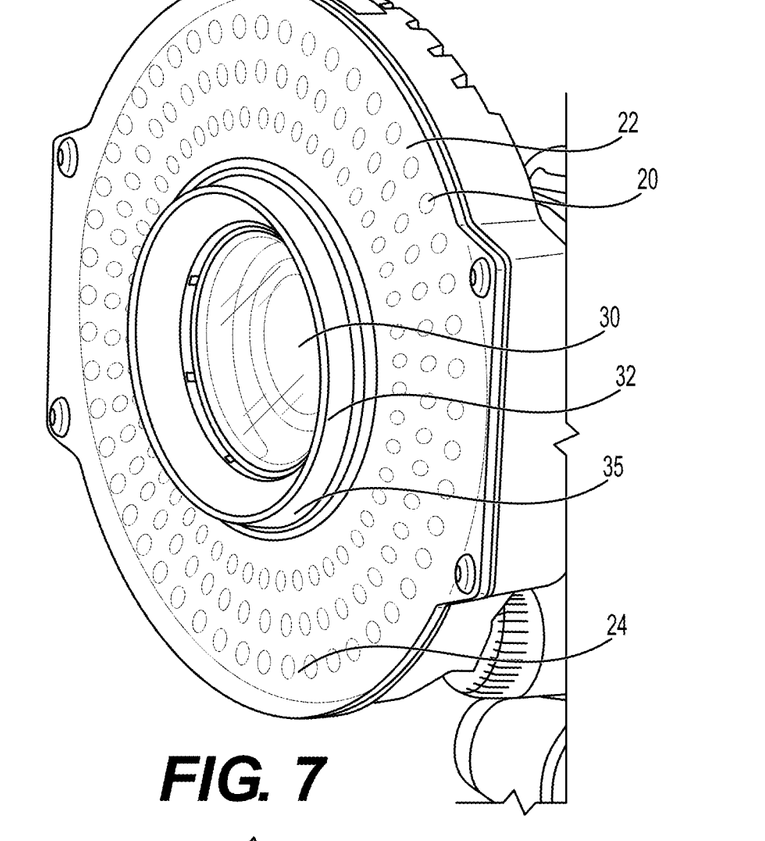
FIG. 7 is a proximal view of one embodiment of an ALS filter holder with an orange filter used in the instant invention.
Figure 8:
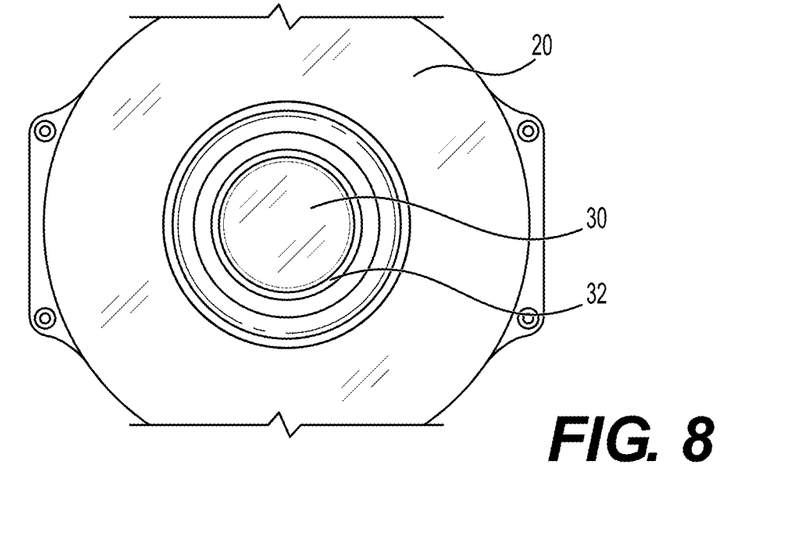
FIG. 8 is a front view of one embodiment of an ALS filter holder with an orange filter used in the instant invention.
Figure 9A:
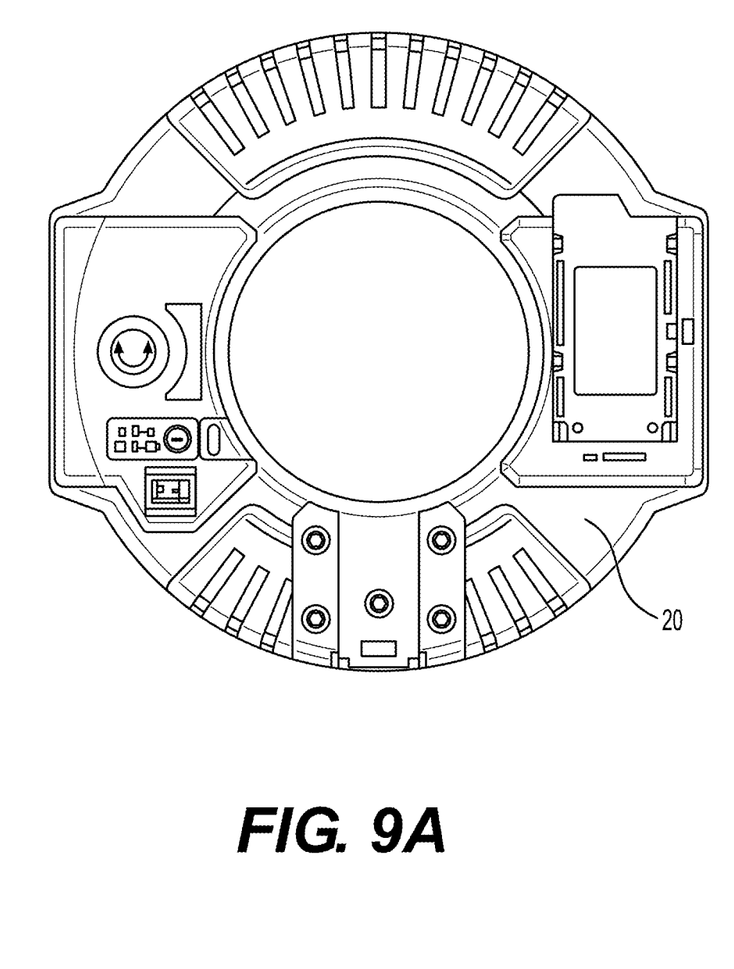
FIG. 9A is a rear view of one embodiment of the back side of a light ring used in the instant invention.
Figure 9B:
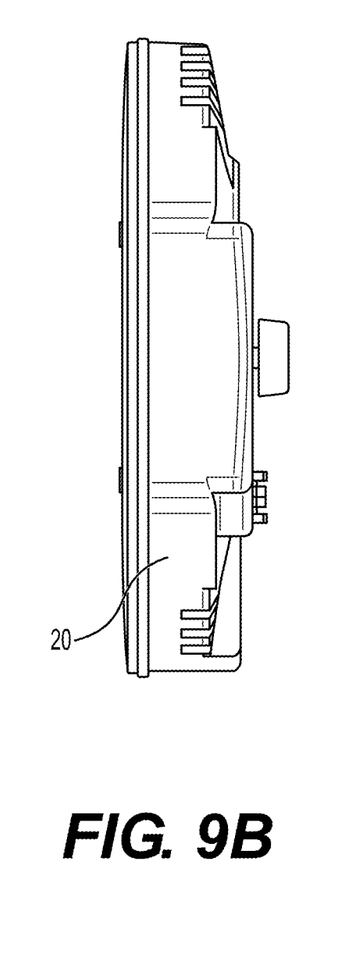
FIG. 9B is a side view of one embodiment of the back side of a light ring used in the instant invention.

The instant invention includes a system 10 for detecting foreign materials comprising an alternative light source (ALS) 20, one or more filters 30 operationally associated with the ALS 20, one or more cameras 50 and camera lenses 40 operationally associated with the ALS 20 and the filters 30, one or more processors, a computer readable memory, and a computer readable storage medium operatively associated with a computing device 60 operatively associated with the ALS and the camera, and one or more sensors 38 operationally associated with the computing device, the ALS, and the camera, wherein the sensors 38 detect the presence of the filter 30. FIG. 1 illustrates one embodiment of a system 10 which includes a mobile cart 70 comprising a base 71 and a vertical member 72. A positioning arm 75 is attached at its proximal end 76 to the base 71/vertical member 72, extending away and holds the ALS 20 at its distal end 77. A computing device 60 is secured to the vertical member and in this embodiment is connected to the ALS by a connection cable 66. A monitor 65 is secured above the computing device 60 and is connected (in this embodiment) by wire to the computing device and the ALS. These connections may also be achieved using wireless technology. The positioning arm is key in this embodiment as it allows the ALS to be focused in any direction desired by the user and then maintained, hands-free, in that position, allowing a single operator to then search for and gather evidence without aid from others.

An alternative light source (ALS) 20 is a tool used by investigators and technicians to enhance observation, photography, and collection of evidence 27 including body fluids, latent fingerprints, hair and fibers, bruises, bite marks, wound patterns, shoe and foot imprints, gun-shot residues, drug traces, questioned documents, bone fragment detection, and the like. Looking to the figures, the ALS 20 of the instant invention has several embodiments and numerous elements. The ALS 20 includes a body 21 with a front 22 and a back 23. On the front 22 of the ALS there are one or more light rings 24 which can emit light in a wide range of wavelengths. The light rings 24 surround an opening 25 which runs from the front 22 to the back 23 of the ALS and are operationally associated with the computing device. The ALS 20 provides more detail than traditional methods thus increasing the amount of evidence uncovered and the quality of the evidence photographed and collected. An ALS system includes one or more lamps containing ultra-violet, visible and infrared components of light. The system then filters down the light into individual color bands (wavelengths) that enhance the visualization of evidence by light interaction techniques including fluorescence (evidence glows), absorption (evidence darkens), and oblique lighting (small particle evidence revealed). Since body fluids like semen, saliva, and vaginal fluids are naturally fluorescent, the use of ALS offers an exceptional method for locating them. An investigator can narrow down the specific locations of stains and/or residues for collection instead of testing entire, large pieces of evidence such as an article of clothing, a mattress, a sheet, or a rug. Dried body fluids will glow under the light source illumination. Background surfaces often glow under UV light and thus fail to yield the quality and the quantity of evidence that can be achieved with a tunable or multiple color band forensic light source. The instant invention includes an ALS 20 which can emit light in wavelengths including white (400-700 nm), ultraviolet (350-380 nm), violet (400-430 nm), blue (420-470 nm), blue/green (445-510 nm), green (480-560 nm), orange (570-610 nm), red (610-660 nm) and/or infrared (800-900 nm) to aid in the visualization and capturing of evidence 27, including bodily fluids. The light rings 24 of the ALS 20 can be dimmable and adjustable either manually or electronically.

Figure 10:
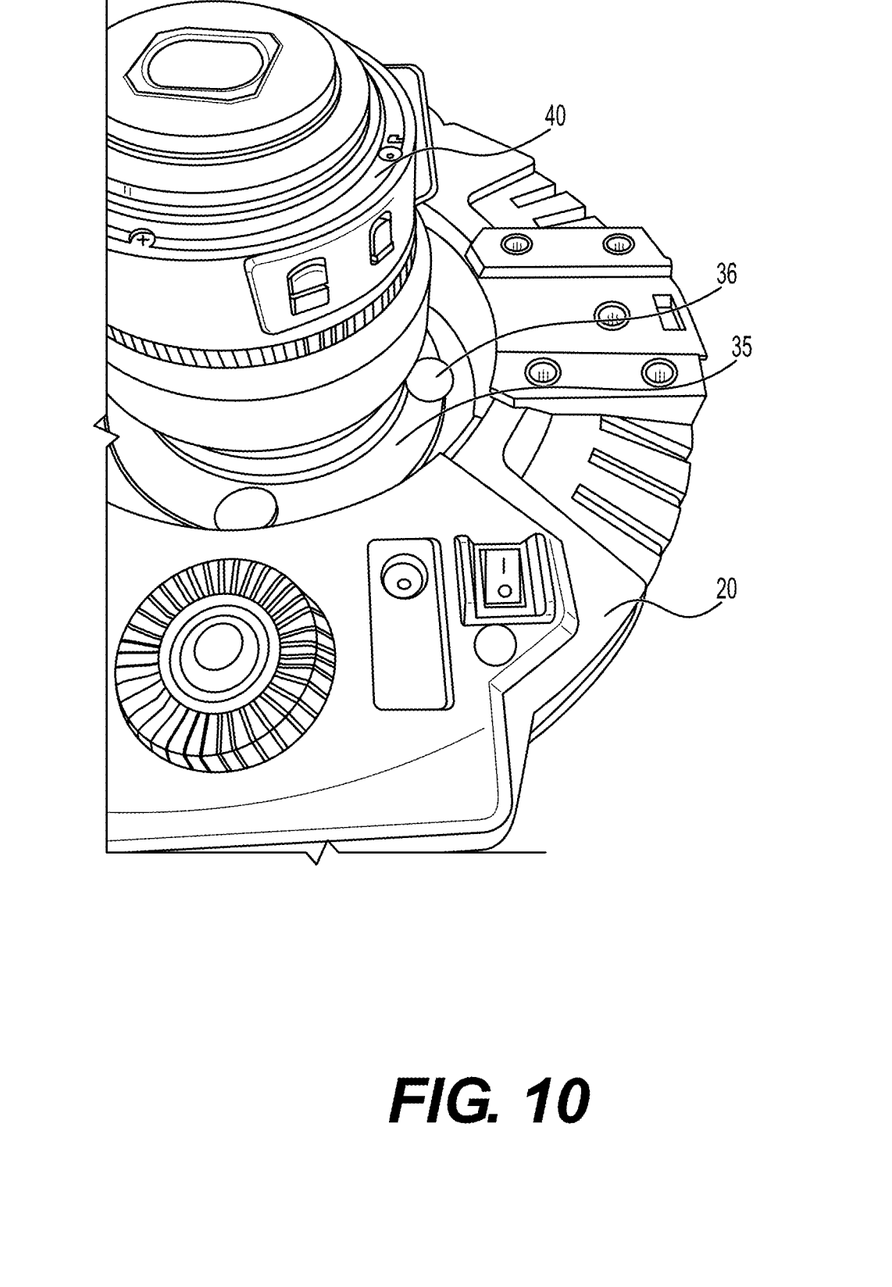
FIG. 10 is a proximal view of one embodiment of the back side of a light ring with a camera lens installed which are used in the instant invention.
Figure 11:
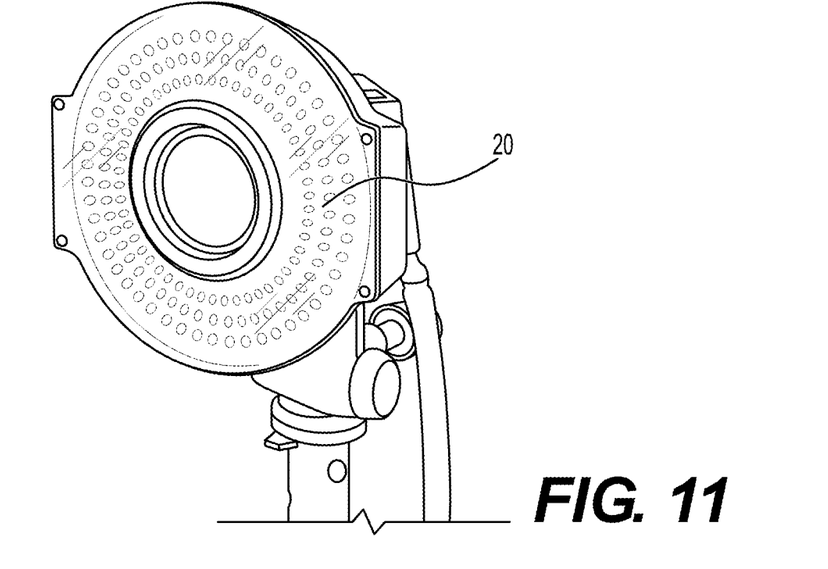
FIG. 11 is a proximal view of one embodiment of the front side of a light ring used in the instant invention.
Figure 12:
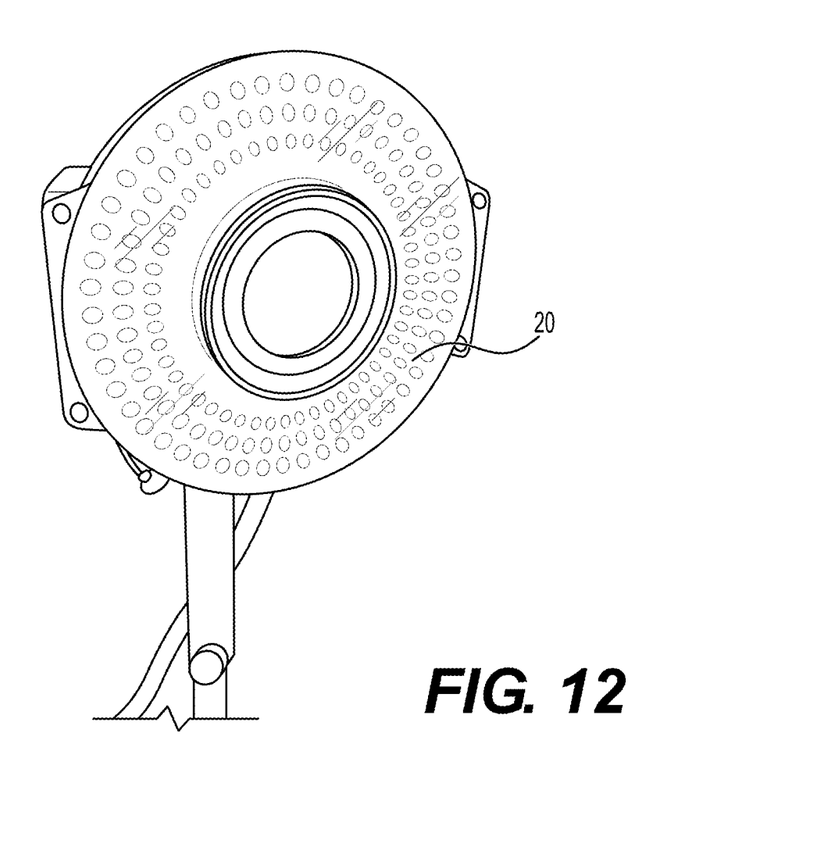
FIG. 12 is a proximal view of one embodiment of the front side of a light ring used in the instant invention.
Figure 13A:
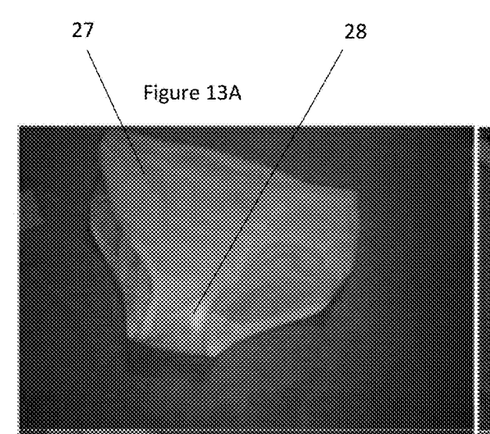
FIG. 13A is a view of a garment illuminated by an ALS viewed through a filter used by the instant invention.
Figure 13B:
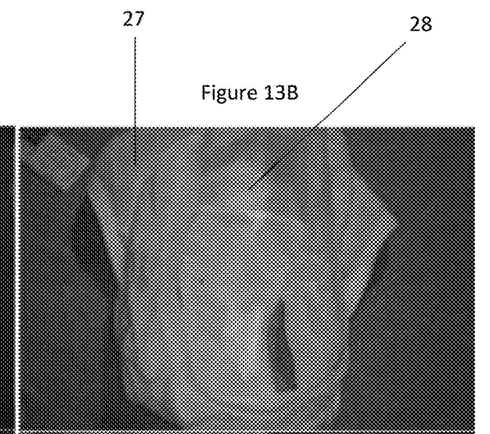
FIG. 13B is a view of a garment illuminated by an ALS viewed through a filter used by the instant invention.
Figure 14A:
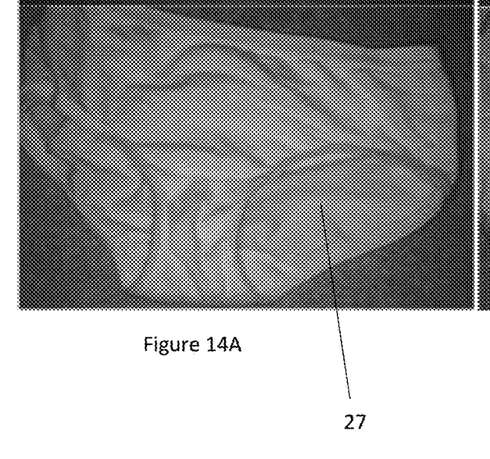
FIG. 14A is a view of a garment un-illuminated by an ALS viewed through a filter used by the instant invention.
Figure 14B:
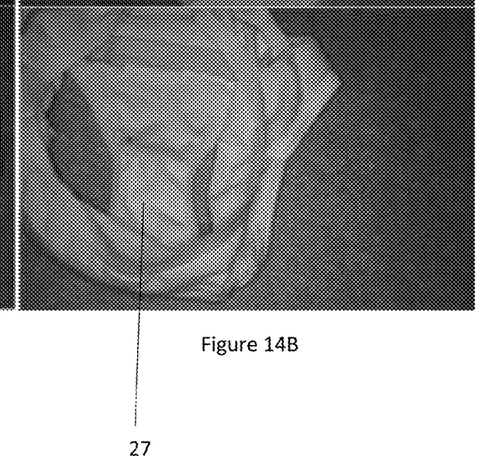
FIG. 14B is a view of a garment un-illuminated by an ALS viewed through a filter used by the instant invention.
Figure 15:
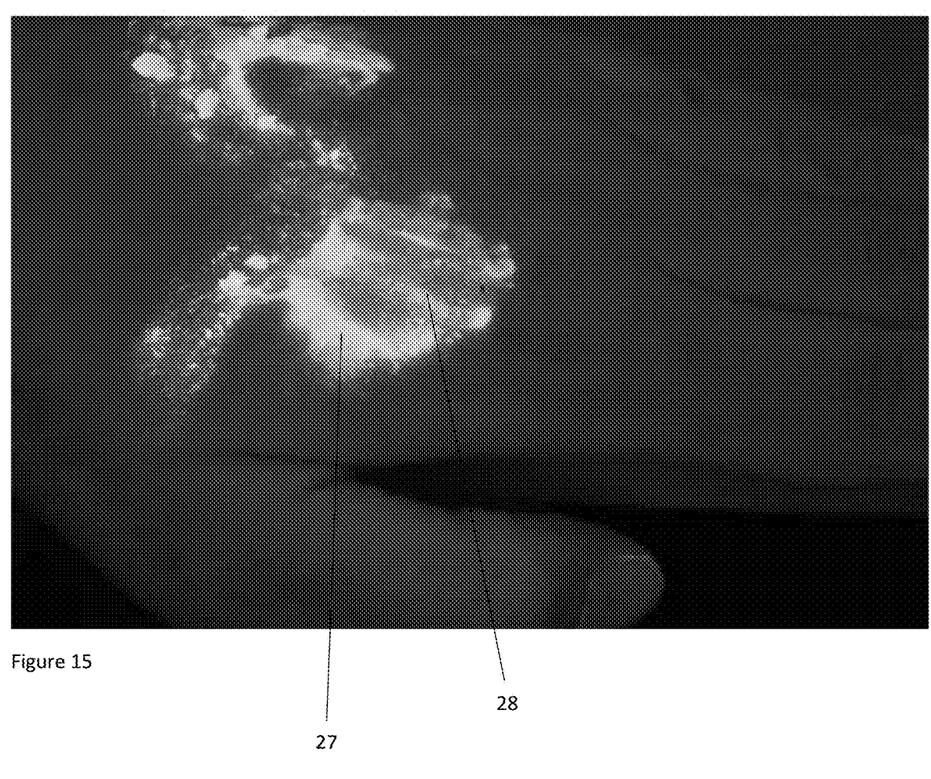
FIG. 15 is a view of a person's skin illuminated by an ALS viewed through a filter used by the instant invention.
Figure 16A:
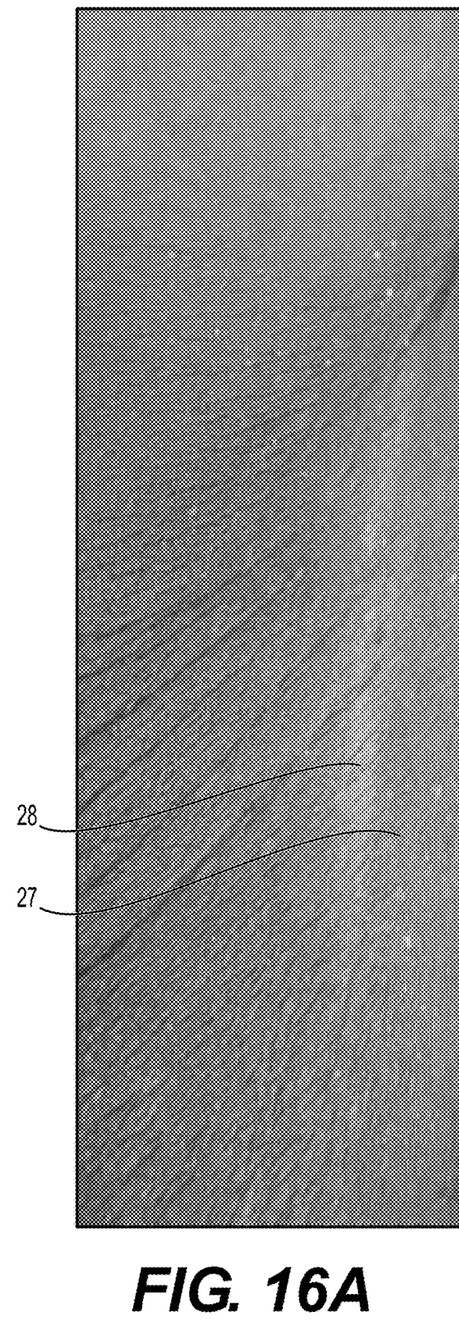
FIG. 16A is a view of a person's skin illuminated by an ALS viewed through a filter used by the instant invention.
Figure 16B:
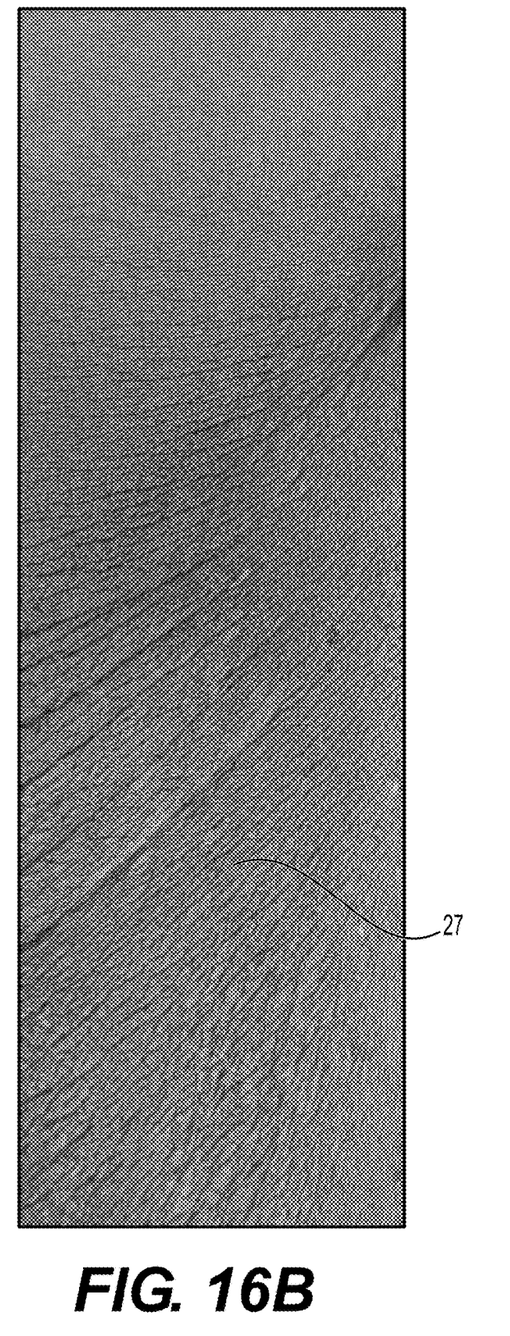
FIG. 16B is a view of a person's skin illuminated by an ALS viewed through a filter used by the instant invention.

FIG. 10 illustrates the back side (23) of light ring, showing step ring in place, with magnets attached and lens attached. One embodiment uses the existing on/off button to switch between white light and blue light source. An alternate embodiment will have a USB type C connector fitted with an SDK set of commands to allow the ring light to be completely controlled by the proprietary software.

The filter 30 can be any filter known in the art and used in forensic analysis and photography. Filters 30 can include, but are not limited to, camera filters, color filters (i.e., UV, orange, yellow, red, or any combination thereof, etc.), light filters, light diffusers, or a combination thereof. Each filter 30 is often engaged to a filter holder 32 which aids in securing the filter 30 to the ALS as described below. The instant invention may further include colored goggles to aid the user in the visualization and capturing of evidence, including bodily fluids. Goggle colors can include any color known in the art and used in forensic analysis and photography and may be the same as the filters described previously.

The instant invention may further comprise a filter holder 32 operationally associated with the ALS 20 and the filter 30 and a lens step ring 35 including one or more magnets 36 operationally associated with the ALS 20 and the filter 30 wherein the lens step ring 35 releasably secures the filter 30 to the ALS 20. The filter holder 32 may be comprised of any material known in the art including, but not limited to, metal, plastic, carbon fiber, ceramic, or any combination thereof. The lens step ring 35 may use any method known in the art to retain the filter 30 in place on the ALS 20 including, but not limited to, magnets, adhesives, hook and loop fasteners, O-rings, threads, or any combination thereof.

The computing device 60 can be any device known in the art including, but not limited to, a desktop computer, a laptop computer, a tablet, a smart phone, a television, or any combination thereof. The sensors can be any sensor known in the art which are able to detect the presence of one or more devices (i.e., a filter) or the absence of one or more devices. The sensor(s) used in the instant invention communicate with the computing device and the ALS to aid the programming instructions in configuring the ALS and the camera based on the available light through the filter. The sensors may acquire data or a signal from each filter, relaying to the sensor the type of filter in place, and pass that data onto the computing device and the ALS. The sensors may relay data and/or signals by any means known in the art including, but not limited to, by wire, wirelessly, or a combination thereof.

The camera 50 can be any camera known in the art and used in forensic analysis and photography, including, but not limited to, film cameras, digital cameras, or any combination thereof. The ALS 20 and the camera 50 communicate with the computing device 60 by wire, wirelessly, or a combination thereof. The camera lenses 40 may be any lens known in the art. Each lens generally engages to the back side of the opening 25 of the ALS and the camera 50 engages to the lens.

The instant invention may further comprise programming instructions to select one or more wavelengths of light to emit from the ALS based on the available light and filter or based on the chosen light and filter. Any of the wavelengths mentioned previously or known to be used and used in forensic analysis and photography may be selected. The instant invention may further comprise programming instructions to configure the ALS and a camera based on the available light and filter. This will allow the user and the camera to manually or automatically adjust the camera setting (i.e., f-stop and shutter speed) to obtain an optimal or desired photograph based on the environmental conditions and the condition of the articles or person being photographed. The instant invention may further comprise programming instructions to detect the presence of one or more types of filters, detected by a sensor operably associated with the ALS, which initiates programming instructions to the ALS, the camera, and the computing device. The instant invention may further comprise programming instructions to capture one or more images of an article and/or subject being photographed.

The instant invention also includes a method of detecting foreign materials comprising the steps of:
a) providing a system for detecting foreign materials comprising:
   an alternative light source (ALS);
   one or more filters operationally associated with the ALS;
   one or more camera lenses operationally associated with the ALS and the filters;
   one or more processors, a computer readable memory, and a computer readable storage medium operatively associated with a computing device operatively associated with the ALS;
   one or more sensors operationally associated with the computing device and the ALS, wherein the sensors detect the presence of the filter; and
   a camera operationally associated with the lens and the computing device;
b) activating the ALS;
c) directing light from the ALS onto a subject or object being examined;
d) locating the foreign materials on the subject or object being examined; and
e) capturing one or more images of the foreign materials with the camera.

The instant invention also includes a method of detecting foreign materials comprising the steps of:
a) providing a system for detecting foreign materials comprising:
   an alternative light source (ALS);
   one or more filters operationally associated with the ALS;
   one or more camera lenses operationally associated with the ALS and the filters;
   one or more processors, a computer readable memory, and a computer readable storage medium operatively associated with a computing device operatively associated with the ALS;
   one or more sensors operationally associated with the computing device and the ALS, wherein the sensors detect the presence of the filter; and
   a camera operationally associated with the lens and the computing device;
b) activating white light LEDS on the ALS;
c) searching over a victim by an examiner for bodily fluids (semen, saliva, sweat or urine) either on clothing or the torso which cannot be detected by the naked eye;
d) collecting physical evidence if a deposit is detected;
e) placing an ALS filter holder with an orange filter in position on the ALS;
f) dimming or extinguishing the room lights in the exam room;
g) activating a sensor/camera light sensor to determine the light level of the room and to detect that the orange filter is in place;
h) initiating the programming instructions to configure the ALS and the camera based on the sensor readings wherein the software reads commands from the camera and automatically switches the camera set up to the appropriate settings (i.e., longer exposure and the camera live view on the monitor);
i) providing orange glasses to the examiner (the same as the orange filter on the camera lens) to see any traces of fluorescence on clothing and skin which is indicative of DNA evidence;
j) deactivating the white light LEDS;
k) activating the blue light LEDS which have a 455 nm wavelength;
l) locating and photographing any areas that fluoresce;
m) documenting any location of areas that fluoresce; and
n) collecting evidence.

The programming instructions of the ALS module guide the user via on screen prompts and controls every facet of the process by direct connectivity with the camera and the ring light. Before commencing, everyone in the room must wear orange safety glasses. When the user wants to use the ALS feature, they tap on the ALS icon on the touch screen. The programming instructions will then automatically turn on the 455 Nm Blue LEDS (or any other desired wavelength) and an onscreen instruction will tell the user to attach the orange filter holder to the opening of the ALS. Depending on the level of ambient light, the examiner can alter the brightness of the ring light by using a slider controller on the touch screen which has a digital readout that can be stored. If a fluorescing residue (highlighted evidence 28) is detected, the examiner will take an ALS photograph as the software has automatically reconfigured the camera to optimize it settings to shoot in low light. The next step is to take a photograph in day light and the software will guide the examiner to simply remove the orange filter holder and the camera sensor detects a big reduction in the orange hue saturation and then automatically switches the ring light to white light. The examiner will then repeat this sequence as many times as necessary dependent on how many areas of evidence requirement ALS activity are present.

The controller makes the ALS process very easy to use for in experienced nurses: Filter on/Filter off—Blue light on/Blue light off—White light on/White light off.

Photographs can be taken using either the touch screen, auditory/voice command, or foot pedal. An immediate comparison of what is seen by the naked eye as compared to the ALS blue light necessitates removing the orange filter lens, switching the ring light back to white light, the normal photograph of the location can be taken. At completion of the examination all the photographs are saved. Patient and examiner should wear protective glasses.

Key Process Features
ALS Filter Holder able to snap in/out of position easily and rapidly
Ability of software to automatically detect filter is in place and initiate ALS mode
LED Light Ring with white light and 455 nm blue light and 505 Nm green light and being able to easily switch between 2 or more wavelengths via the touch screen interface and adjust the light intensity using an on-screen wheel controller or other user interface.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:

1. A system for detecting foreign materials comprising:
an alternative light source (ALS);
one or more filters operationally associated with the ALS;
one or more cameras and camera lenses operationally associated with the ALS and the filters;
one or more processors, a computer readable memory, and a computer readable storage medium operatively associated with a computing device operatively associated with the ALS and the camera;
one or more sensors operationally associated with the computing device and the ALS, and camera, wherein the sensors detect the presence of the filter;
a filter holder operationally associated with the ALS and the filter; and
a lens step ring including one or more magnets operationally associated with the ALS and the filter;
wherein the lens step ring releasably secures the filter to the ALS;
wherein the one or more sensors detects the presence of the one or more filters when they are secured to the filter holder; and
wherein the sensor activates programming instructions to change the wavelength of light generated by the ALS based on the filter detected.

2. The system of claim 1 further comprising:
programming instructions to select one or more wavelengths of light to emit from the ALS.

3. The system of claim 1 further comprising:
programming instructions to configure the ALS and the camera based on available light and filters; and
programming instructions to capture one or more images of a subject being photographed.

4. The system of claim 1 further comprising:
one or more rings of lights surrounding an opening through the ALS, the lights being operationally associated with the computing device.

5. The system of claim 1 wherein the ALS can emit light in wavelengths including white (400-700 nm), ultraviolet (350-380 nm), violet (400-430 nm), blue (420-470 nm), blue/green (445-510 nm), green (480-560 nm), orange (570-610 nm), red (610-660 nm) and/or infrared (800-900 nm).

6. The system of claim 1 wherein the filter is selected from the group including: orange, yellow, red, or any combination thereof.

7. The system of claim 1 wherein the ALS and the camera communicate with the computing device by wire, wirelessly, or a combination thereof.

8. A method for detecting foreign materials comprising the steps of:
a) providing a system for detecting foreign materials comprising:
an alternative light source (ALS);
one or more filters operationally associated with the ALS;
one or more camera lenses operationally associated with the ALS and the filters;
one or more processors, a computer readable memory, and a computer readable storage medium operatively associated with a computing device operatively associated with the ALS;
one or more sensors operationally associated with the computing device and the ALS, wherein the sensors detect the presence of the filter;
a filter holder operationally associated with the ALS and the filter; and a lens step ring including one or more magnets operationally associated with the ALS and the filter;
wherein the lens step ring releasably secures the filter to the ALS;
wherein the one or more sensors detects the presence of the one or more filters when they are secured to the filter holder; and
wherein the sensor activates programming instructions to change the wavelength of light generated by the ALS based on the filter detected:
a camera operationally associated with the lens and the computing device;
b) activating white light LEDS on the ALS;
c) securing one or more filter to the ALS;
d) detecting the presence of the filter using the one or more sensors;
e) deactivating the white light LEDs on the ALS;
f) activating blue light LEDS on the ALS;
g) directing light from the ALS onto a subject or object being examined;
h) locating the foreign materials on the subject or object being examined; and
i) capturing one or more images of the foreign materials with the camera.

9. The method of claim 8 further comprising:
programming instructions to select one or more wavelengths of light to emit from the ALS.

10. The method of claim 8 further comprising:
programming instructions to configure the ALS and the camera based on available light and filters; and
programming instructions to capture one or more images of a subject being photographed.

11. The method of claim 8 further comprising:
one or more rings of lights surrounding an opening through the ALS, the lights being operationally associated with the computing device.

12. The method of claim 8 wherein the ALS can emit light in wavelengths including white (400-700 nm), ultraviolet (350-380 nm), violet (400-430 nm), blue (420-470 nm), blue/green (445-510 nm), green (480-560 nm), orange (570-610 nm), red (610-660 nm) and/or infrared (800-900 nm).

13. The method of claim 8 wherein the filter is selected from the group including: orange, yellow, red, or any combination thereof.

14. The method of claim 8 wherein the ALS and the camera communicate with the computing device by wire, wirelessly, or a combination thereof.

* * * * *